United States Patent

Jespersen

[15] 3,695,577

[45] Oct. 3, 1972

[54] VALVE, PARTICULARLY A THERMOSTATIC EXPANSION VALVE FOR REFRIGERATING EQUIPMENT

[72] Inventor: Hans Jorgen Jespersen, Sonderborg, Denmark

[73] Assignee: Danfoss A/S, Nordborg, Denmark

[22] Filed: Nov. 16, 1970

[21] Appl. No.: 89,832

[30] Foreign Application Priority Data

Nov. 27, 1969    Germany..........P 19 59 547.2

[52] U.S. Cl.................................251/61.4, 251/337
[51] Int. Cl.............................................F16k 31/145
[58] Field of Search....251/61.4, 61.3, 322, 323, 337; 137/505.14, 505.42, 505.43

[56] References Cited

UNITED STATES PATENTS

| | | |
|---|---|---|
| 3,478,774 | 11/1969 | Noakes..................251/61.4 X |
| 1,026,472 | 5/1912 | Smith........................251/337 |
| 1,003,812 | 9/1911 | Schultz..................251/323 X |

*Primary Examiner*—Arnold Rosenthal
*Attorney*—Wayne B. Easton

[57] ABSTRACT

The invention relates to a thermostatic valve or the like of the type in which a spindle having a valve closure element at one end thereof is acted upon in one direction by a pressure responsive element and is biased in the other direction by a spring. The spindle is provided with screw threads and the spring which is conically shaped, has a coil portion complementary to and threadably engageable with the screw threads. The tension of the spring is adjusted by rotation of the spindle with a screwdriver or wrench depending on the type of tool engaging fitting the spindle is provided with at the lower end thereof.

7 Claims, 3 Drawing Figures

PATENTED OCT 3 1972 3,695,577
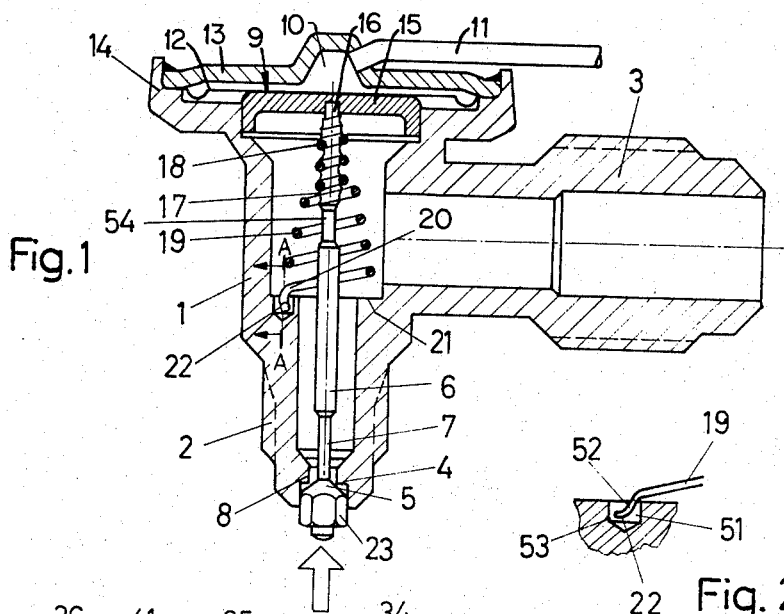
Fig. 1
Fig. 2
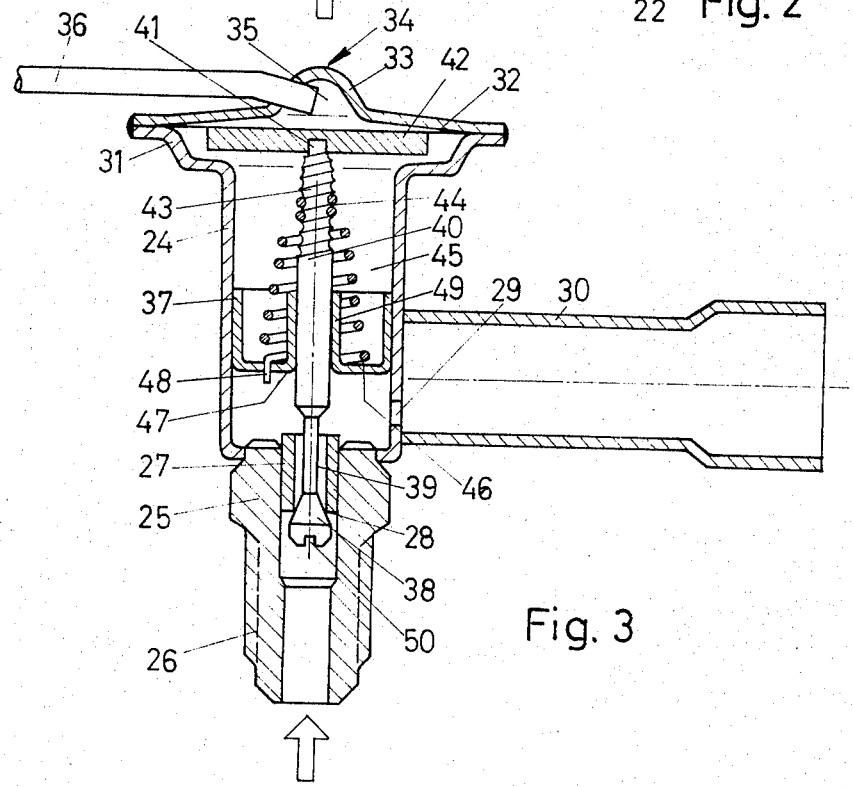
Fig. 3

VALVE, PARTICULARLY A THERMOSTATIC EXPANSION VALVE FOR REFRIGERATING EQUIPMENT

The invention relates to a valve, particularly a thermostatic expansion valve for refrigerating equipment, the spindle of which valve is acted upon by an operating element and is biased in the opposite direction by a rated spring that can be adjusted by means of some device.

The operating element can be part of a thermostatic, pressostatic or like system, and produces a pressure which is counteracted by the force of the rated spring. If a predetermined balance of forces is exceeded or not reached, the valve opens or closes. To ensure that the valve responds in a precise manner at the required temperature, pressure or the like, the rated spring is provided with a setting device. If adjustment of a required value is not desired during operation, at least adjustment of the required value can be carried out in the factory in this way, as is frequently the case with the above mentioned expansion valves.

In the known valves of this kind, the rated spring is supported by a backing element firmly connected to the spindle of the valve. An axially displaceable backing element bears against the other end of the spring, and this element is in turn connected to an actuating element for effecting axial displacement. This involves considerable expense. This is particularly true when the rated spring is fitted between the operating element and a nozzle, since there then occur difficulties in engaging an actuating element with the displaceable backing member. Valves are also known in which the rated spring is fitted on that side of the valve seat remote from the operating element so that the spring is more readily accessible. This however has a limiting effect upon the versatility of the construction; thus for example it is not possible to devise angle valves of this kind.

The object of the invention is to produce more cheaply a valve of the initially described kind by simplifying the setting device, and to provide the greatest possible freedom as regards construction.

According to the invention, this object is achieved by the spindle being arranged to rotate in the housing and by its having a screw thread in the groove of which a complementarily coiled end of the spring engages, whilst the other end of the spring bears against a backing means solid with the housing.

When the spindle is rotated, the end of the spring engaging in the screw thread is displaced in the axial direction. Since the other end of the spring bears against a fixed backing means, it is thus possible to set or adjust the required value. The spindle therefore takes over the function of the actuating member and of the axially displaceable backing means of the setting device.

The rated spring is usually under a tension such that even frictional contact with the fixed backing means suffices to prevent rotation during setting. The end of the spring bearing on the fixed backing means can however also be locked against rotation, for example by associating with this end of the spring a hook which is bent over substantially parallel to the axis and which engages in a recess in the backing surface.

In this connection, it is particularly advantageous if, in the circumferential direction, the shape of the hook is changed over an inclined portion to give a bearing portion extending parallel to the backing surface. When the spring is completely relaxed, it can no longer rotate relatively to the spindle upon reaching the upper end of the screw thread. No undesirable deformation occurs however since upon further rotation of the spindle, the hook moves out of the recess in which it would be otherwise held as a result of the spring tension.

The spring is preferably coiled to a conical shape. During fitting its smallest diameter can then guide the spindle concentrically if its greatest diameter is held in a cavity in the valve.

The spindle preferably has a portion of reduced diameter adjoining the screw thread and at that end of the thread nearer the backing means. When the spring reaches the position in which it is fully loaded, it moves out of the screw thread into the portion of reduced diameter. Further rotation of the spindle in the direction for tightening does not cause an increase in the spring bias.

In a preferred construction, the spring and backing means are disposed between the operating element and the valve seat, and at that of its ends projecting beyond the seat, the spindle incorporates a rotatable setting means. Although the spring is located in an "inaccessible" position, it can be adjusted in a simple manner.

Furthermore, the free end of the spindle can be mounted to rotate in a recess in the movable end plate of the operating element, the screw thread on the shaft can be near this bearing point, and the spindle can be held in a guide near the backing means, which guide projects into the conically wound spring. This results in reliable guiding of the movable parts while keeping the construction short.

The spring is preferably fitted in a housing part which consists of solidly interconnected shaped sheet-metal parts and from which the shaft projects. The use of shaped sheet-metal parts makes it necessary to interconnect the individual housing parts in a solid manner e.g. by soldering or welding. The spring is then located in a closed-off compartment from which only the spindle projects. This however is sufficient to enable the spring to be adjusted.

A particularly simple but very rigid construction is obtained if the housing part is constituted by a cup-like element, the end cover plate of the operating element and a backing insert, in which arrangement the cup-like element carries at its base a valve seat insert with an inlet port, has on one of its side walls an outlet port, and on a flange, which is provided at the open end for supporting the movable part of the operating element, carries the cover plate, while between its base and open end it supports the backing insert.

The invention will now be described in more detail, by reference to two embodiments illustrated in the drawing, in which:

FIG. 1 shows a first thermostatic expansion valve in longitudinal section,

FIG. 2 is a section through a detail on line A—A of FIG. 1, and

FIG. 3 shows a second thermostatic expansion valve in longitudinal section.

The valve shown in FIG. 1 has a housing 1 having an inlet port 2 and an outlet port 3. Fitted in the inlet port 2 is a valve seat 4 which cooperates with a closure member 5. The closure member is mounted on a valve spindle 6, which has a portion 7 of reduced diameter whereby it extends through a nozzle orifice 8 disposed beyond the seat 4. The diameter of this nozzle orifice 8 is slightly greater than the diameter of the spindle 6.

At the upper end of the housing 1 is located an operating element 9, the interior 10 of which is connected to a sensor by way of a capillary tube 11. The operating element is defined by a diaphragm 12 and a fixed cover plate 13 which are held by their edges in a flange 14 on the housing 1. The diaphragm acts on an end plate 15 which is guided in the housing 1 and which has at its center a recess 16 for supporting the upper end of the spindle 6.

Near its upper end the spindle has a coarse screw thread 17 in which engages the complementarily coiled end 18 of a conical rated spring 19. The other end 20 of the rated spring is supported on a backing means 21 integral with the housing. A bent-over hook 22 extends into a recess 51 in the housing. The hook 22 has an inclined portion 52 and a bearing portion 53 parallel with the backing means 21. The recess 51 is of a diameter matched to the length of the hook 22. The end of the shaft projecting beyond the seat 4 is here constituted by an extension 23 of the closure member 5, which extension is of hexagonal cross section, so that it can be readily gripped by a tool. Furthermore, the extension is guided in a bore in the housing 1 in such manner as to leave an unimpeded flow cross section. The hexagonal extension is welded on to the spindle. Below the screw thread 7, the spindle 6 has a portion 54 of reduced diameter.

During fitting, the spring 19 is first screwed on to the spindle 6 and the latter is inserted in the housing. The end plate 15 is then inserted and the operating element 9 is secured to the housing. Finally, the hexagonal extension 23 is pushed on to the spindle 6, the operating element 9 is brought into a predetermined position, and the extension 23 is then welded securely on to the spindle.

The spindle is then rotated until the required pressure from the rated spring is obtained. If the load on the spring exceeds an upper limit, the upper end of the spring moves from the screw thread on to the portion 54 of the spindle, so that further loading of the spring is not possible. If, at the lower load limit, the spring abuts against the end plate 15, further rotation of the spindle causes the hook 22 to slip out of the recess 51 so that no further deformation of the spring 19 occurs.

In the embodiment shown in FIG. 2, a cup-like sheet-metal element 24 carries at its base an insert 25 which also constitutes an inlet port 26 and into which is pressed a sleeve 27 comprising a valve seat 28. One of the side walls of the sheet-metal elements 24 contains an opening 29. Near this there is connected an outlet port 30 made of sheet-metal. At its open end, the element 24 has a flange 31 on which bears a diaphragm 32 which is secured by the flange and an end cover plate 33 of an operating element 34. The interior 35 of the working element communicates with a sensor through a capillary tube 36. Inside the element 24 a backing insert 37 is secured between the base and open end of said element.

A closure member 38 is mounted on a spindle 40, a portion 39 of smaller diameter extending between the main body of the spindle and said closure element; the upper end of the spindle extends into a recess 41 in a movable end plate 42. Here too, the spindle has a screw thread 43 in which engages a complementarily wound end 44 of a conical rated spring 45. The other end 46 of this spring is supported on a backing surface 47 of the insert 37. A bent-over hook 46 engages in a hole in this insert. The spindle 40 moves in a guide 49 forming part of the insert and at its free end has a slot 50 into which a screwdriver can be inserted.

When the valve is assembled, the element 24, the insert 37, the port 30 and the insert 25 with the pressed-in sleeve 27 are joined. The spring 45 and the end plate 42 are then inserted and the operating element 34 is secured. Finally, the spindle 40 is screwed in from the bottom, the inside diameter of the sleeve 27 being somewhat greater than the diameter of the spindle 40, and the inside diameter of the inlet port 26 somewhat greater than the diameter of the closure member 38. The required load on the rated spring can be obtained by rotating the spindle 40.

Both embodiments relate to valves in which the rated spring is set in the factory. Consequently, the spindle can be contained entirely in the medium to be regulated. If it is required to make an adjustment after fitting of the valve, the spindle can be moved outwards through a seal as is the case with numerous thermostatic valves.

I claim:

1. A thermostatic expansion valve or the like comprising a casing having inlet and outlet ports, valve means for one of said ports having a valve seat and a valve closure member, a movable operating element, a spindle having one end thereof in abutting engagement with operating element, said spindle having screw threads, spring means having a coil portion complementary to and threadably engageable with said screw threads, said valve closure member being connected to said spindle, said spindle being movable in one direction by said operating element and biased in the opposite direction by said spring means, adjustment means for turning said spindle to adjust the tension of said spring means, and fastening means for preventing rotation of one end of said spring means relative to said casing.

2. A thermostatic expansion valve or the like according to claim 1 wherein said fastening means comprises a recess in said casing and a hook on said spring means disposed in said recess.

3. A thermostatic expansion valve or the like according to claim 2 wherein said recess is in a casing surface which is normal to said spindle, said hook having an inclined portion which is inclined relative to said surface and a terminal end portion which is generally parallel to said surface.

4. A thermostatic expansion valve or the like according to claim 1 wherein said spring means has a generally conical shape.

5. A thermostatic expansion valve or the like according to claim 1 wherein said spindle has a section of reduced diameter adjacent said screw threads thereof.

6. A thermostatic expansion valve or the like according to claim 1 wherein said adjustment means and said valve closure member comprise a single integrated element.

7. A thermostatic expansion valve or the like according to claim 1 wherein said casing includes a cylindrically shaped section surrounding said spindle, an annular cup-shaped element having a central sleeve portion mounted in said cylindrically shaped section, said spring means being nested in said cup-shaped element and said sleeve portion thereof forming a guide for said spindle.

* * * * *